(12) United States Patent
Redding

(10) Patent No.: US 6,849,182 B2
(45) Date of Patent: Feb. 1, 2005

(54) HYDROCYCLONE HAVING UNCONSTRAINED VORTEX BREAKER

(75) Inventor: Carter E. Redding, Greenwood, CA (US)

(73) Assignee: Heron Innovators Inc., Roseville, CA (US)

( * ) Notice: Subject to any disclaimer, the term of this patent is extended or adjusted under 35 U.S.C. 154(b) by 69 days.

(21) Appl. No.: 10/249,883

(22) Filed: May 14, 2003

(65) Prior Publication Data

US 2004/0226879 A1 Nov. 18, 2004

(51) Int. Cl.$^7$ .................. B01D 17/038; B01D 21/26; B01D 45/12
(52) U.S. Cl. ............... 210/512.1; 209/720; 209/733; 55/459.1; 55/462
(58) Field of Search ............... 210/512.1, 512.2, 210/788; 209/715, 720, 721, 725, 730, 732, 733; 55/459.1, 462, 463

(56) References Cited

U.S. PATENT DOCUMENTS

| | | | |
|---|---|---|---|
| 3,568,847 A | | 3/1971 | Carr .................... 209/721 |
| 4,399,027 A | * | 8/1983 | Miller .................. 209/730 |
| 4,786,412 A | | 11/1988 | Lister et al. ........... 210/512.1 |
| 6,024,874 A | | 2/2000 | Lott .................... 210/512.1 |

* cited by examiner

*Primary Examiner*—David A Reifsnyder

(57) ABSTRACT

A hydrocyclone having a flat lower plate 14 contains a tube or rod 22 placed unconstrained within the body 10. The tube or rod 22 acts as a vortex breaker, reducing the rate at which air is introduced through the center of the vortex at the lower outlet aperture 16 during operation. When the hydrocyclone of the invention is employed for classification of pressurized stabilized gas-liquid emulsions into fractions of greater and lesser bulk density, the greater bulk density fraction is ejected from the lower outlet aperture 16 and the lesser bulk density fraction flows under pressure out the vortex finder tube 20.

3 Claims, 2 Drawing Sheets

HYDROCYCLONE HAVING UNCONSTRAINED VORTEX BREAKER

BACKGROUND OF INVENTION

1. Field of the Invention

This invention relates to hydrocyclones, and more particularly to a hydrocyclone having an unconstrained tube or rod serving as a vortex breaker within the hydrocyclone body.

2. Description of Related Art

A cyclone is a device commonly used to separate entrained solids from liquids or gases, or to classify entrained solids into lower and higher density fractions. In the usual application, a carrier fluid (gas or liquid), containing solid particles of varying densities greater than the fluid density, enters the vertical body of a cyclone under pressure through a horizontal tangential inlet located near the top. The energy of the entering suspension is converted to rotation within the body of the cyclone. The different density components stratify under centrifugal force. Carrier fluid, containing most of the higher density solid particles, is discharged at the apex located at the bottom end of the cyclone body, and the remainder of the carrier fluid, also containing lower density solid particles, is discharged through a "vortex finder" tube protruding through the center of the top end near the tangential inlet and terminating below the invert of the tangential inlet. When the fluid is water or other liquid, the term hydrocyclone is frequently used to describe such a device. Besides the usual application of classifying suspensions of particulate matter in liquids, hydrocyclones have also found application in separation of non-emulsified oils from water, where the oil is only slightly less dense than water.

In the operation of a hydrocyclone, an outer vortex or helical flow pattern containing dense particles (or, in the case of oil-water separation, the water phase) progresses from the inlet end towards the apex end, while concurrently an inner vortex or helical flow pattern concentric with the outer vortex containing mostly carrier liquid with lower-density material (or, in the case of oil-water separation, the oil phase) progresses in the opposite direction, towards the vortex finder. An air core forms within the inner vortex in the vacuum occurring at or near the center longitudinal axis, starting at the apex and extending upwards. The maintenance and control of the outer and inner vortices, and the air core, is important to the function of hydrocyclones in classifying or separating entrained material of a density greater than or slightly less than that of the carrier liquid, where the higher-density material is concentrated in the flow leaving the apex.

Hydrocyclones almost always are designed with a tapered body, where higher and higher centrifugal forces develop as the rotating mass is displaced downward within the body, because unacceptably low separation efficiencies result if the body is cylindrical. Numerous means have been devised to increase the efficiency of separation of dense particulates from the carrier fluid in tapered body hydrocyclones, such as the elongate core extending downward from the vortex finder described in U.S. Pat. No. 6,024,874 dated Feb. 15, 2000, the adjustable flow restrictor within the vortex finder described in U.S. Pat. No. 3,568,847 dated Mar. 9, 1971, and the dewatering tube extending upwards from the apex described in U.S. Pat. No. 4,786,412 dated Nov. 22, 1988. Hydrocyclones are most commonly installed vertically, with the tangential inlet and vortex finder at the top, although in some applications the angle from the vertical varies up to 90 degrees.

Stabilized emulsions of gases in liquids (usually air in water) are useful in industrial separation processes, cleaning of textiles and surfaces, fire suppression, and other applications. The gas phase of such emulsions is comprised of a very large number of fine bubbles in the size range of 5 to 100 microns, each bubble coated with a film of surfactant to prevent immediate coalescence of the bubbles. The fluid properties of stabilized air-water emulsions are unusual, in that the bulk density is between 30% and 80% of the density of water, yet the viscosity is very nearly equal to that of water. When producing these emulsions in a recycle type generator, it has been found necessary to classify a stream of emulsion into fractions of lower and higher bulk densities in order to obtain the desired emulsion quality.

The literature has almost no references relating to the use of hydrocyclones for classifying suspensions or emulsions of gases in liquids, although laboratory bench scale continuous air-water emulsion generators using two small tapered-body hydrocyclones in series are known to be able to classify a stabilized gas-liquid emulsion into two fractions of different bulk densities, where the emulsified material (air) is far less dense than the carrier fluid (water). The hydrodynamics of this kind of two-phase system in hydrocyclones is not well understood. In operation, pressurized recycled air-water emulsion stabilized with a surfactant enters the tangential inlet of the first hydrocyclone. The lower bulk density emulsion fraction issues under pressure through the top (vortex finder) outlet of the first hydrocyclone, while the higher bulk density emulsion fraction is ejected out of the apex. The emulsion product from the first hydrocyclone is further classified by introducing it into the tangential inlet of a second hydrocyclone. Emulsion product of still lower bulk density, of suitable quality for experimental use, issues under pressure from the top (vortex finder) outlet of the second hydrocyclone while a relatively denser emulsion fraction is ejected out of the apex. The maximum possible rate of production of stabilized air-water emulsion using this type of apparatus is less than 1.3 gallons per minute.

Numerous attempts at simple scaleup of hydrocyclone classifiers for gas-liquid emulsions have heretofore proven unsuccessful beyond a production rate of about 2 gallons per minute of emulsion, due to the inoperability of hydrocyclones larger in inside diameter than about ¾ inches in this application. The inventor found by experimentation, using either commercially available tapered body hydrocyclones or custom-built cylindrical bodied hydrocyclones with various combinations of dimensions, that for hydrocyclone body diameters greater than ¾ inch and inlet emulsion flow rates greater than about 5 gallons per minute, greater bulk density emulsion issued from the vortex finder at the upper end and lesser bulk density emulsion issued from the apex. The inventor observed that the fluid rotating within the lower portion of the hydrocyclone was of lesser density than the average density throughout the entire volume of the hydrocyclone, apparently due to the entry of excess air through the apex countercurrent to the flow of emulsion out the apex, and concluded that this was why lesser-density emulsion was observed discharging from the apex. This was the reverse of the desired action, and prevented the generation of acceptable quality emulsion.

SUMMARY OF INVENTION

Prior art discloses the highly unusual application of hydrocyclones for classifying stabilized gas-liquid emulsions into differing density fractions, although at low rates. The objective of the present invention is to render hydrocyclones with body diameters greater than about ¾ inches effective in classifying stabilized gas-liquid emulsions into fractions with greater and lesser bulk densities, where the lesser-density fraction will discharge through the vortex finder for further classification or use.

This objective of the present invention is attained by placing a tube or rod within a hydrocyclone having a body truncated at its lower end with a flat plate perforated with a lower outlet aperture, and leaving the tube or rod to move about unconstrained during operation. The unconstrained tube or rod minimizes the formation of an air core and reduces the rate of air entering the lower outlet aperture. The result is that emulsion of lesser bulk density than the feed emulsion, and of acceptable quality for further classification or use in separation, cleaning, fire suppression, and other processes, is discharged through the vortex finder, while emulsion of greater bulk density than the feed emulsion is discharged from the lower outlet aperture for recycling through the emulsion generating apparatus.

The introduction of an unconstrained vortex breaking tube or rod into a flat-bottom hydrocyclone as in the present invention allows production of up to 200 gallons per minute of desirable quality stabilized gas-liquid emulsion using hydrocyclones with body diameters up to at least 8 inches, where heretofore the maximum feasible body diameter was about ¾ inches and the maximum possible production rate was only about 2 gallons per minute. Thus, use of the hydrocyclone of the present invention renders feasible and economical the separation of solids from liquids in very large industrial process streams, large-scale cleaning processes, and full-scale fire suppression operations, among other applications.

DETAILED DESCRIPTION

Figure 1:
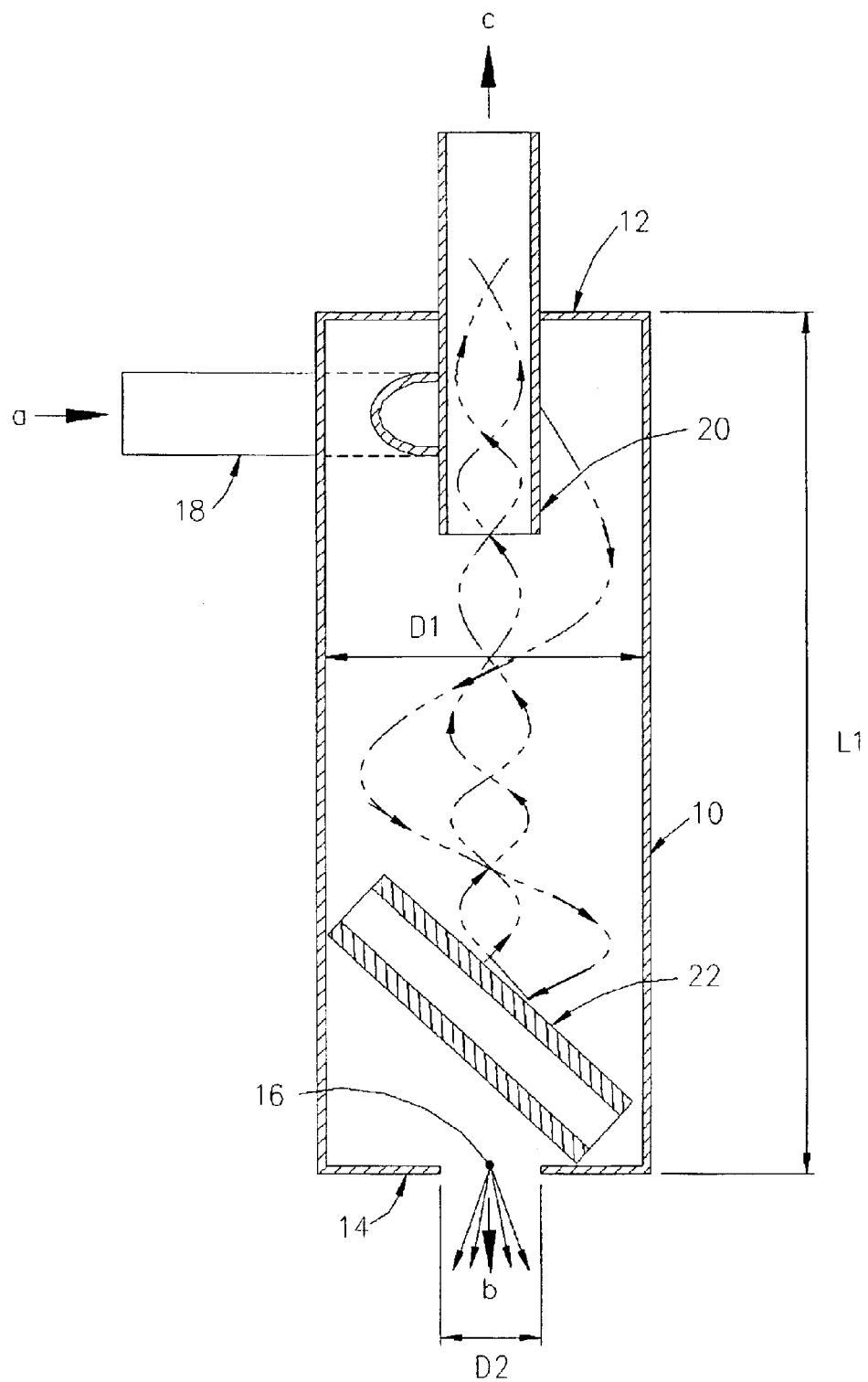
FIG. 1 is a longitudinal sectional view of the hydrocyclone in accordance with the preferred embodiment of the invention.

As shown in FIG. 1, a hydrocyclone according to the preferred embodiment of the invention is generally similar to hydrocyclones commonly employed in industrial applications for separation of dense particulate matter from fluids, and separation of oil from water, but differs significantly in its internal configuration due to its specialized application of classifying a stabilized gas-liquid emulsion into greater and lesser bulk density components. In particular, the tapered body configuration found in nearly all commercially available hydrocyclones is not necessary for efficient function in classifying stabilized gas-liquid emulsions.

The description of the preferred embodiment assumes a vertical orientation of the hydrocyclone, although the function of the hydrocyclone of the invention in classifying stabilized gas-liquid emulsions is not materially different for orientations from vertical to horizontal.

As shown in FIG. 1, body of hydrocyclone 10 is rigid, cylindrical in shape in the preferred embodiment, but may be tapered to a lesser diameter at the lower outlet end. Body 10 has an inside diameter in the range of from 1 inch to 8 inches, and has a ratio of length L1 to inside diameter D1 of from about 4 to about 8. Body 10 is enclosed with flat plates at its upper end (upper plate 12) and at its lower (distal) end (lower plate 14). Each of plates 12 and 14 is oriented perpendicular to the longitudinal axis of body 10. Lower plate 14 has a diameter at least 3 times the diameter of lower outlet aperture 16. Lower outlet aperture 16 perforates the center of lower plate 14, and is preferably circular, with a diameter D2 of from about 20% to about 35% of the inside diameter D1 of body 10. Tangential inlet conduit 18 is oriented perpendicular to the longitudinal axis of body 10 and communicates with the wall of body 10 at an angle roughly perpendicular to the diametric axis of body 10 at the point of connection, similar to hydrocyclone fabrication practices common in the art. Vortex finder tube 20 is concentric with body 10 and protrudes through upper plate 12 of body 10 such that its lower terminus is below the invert of tangential inlet conduit 18.

Figure 2:
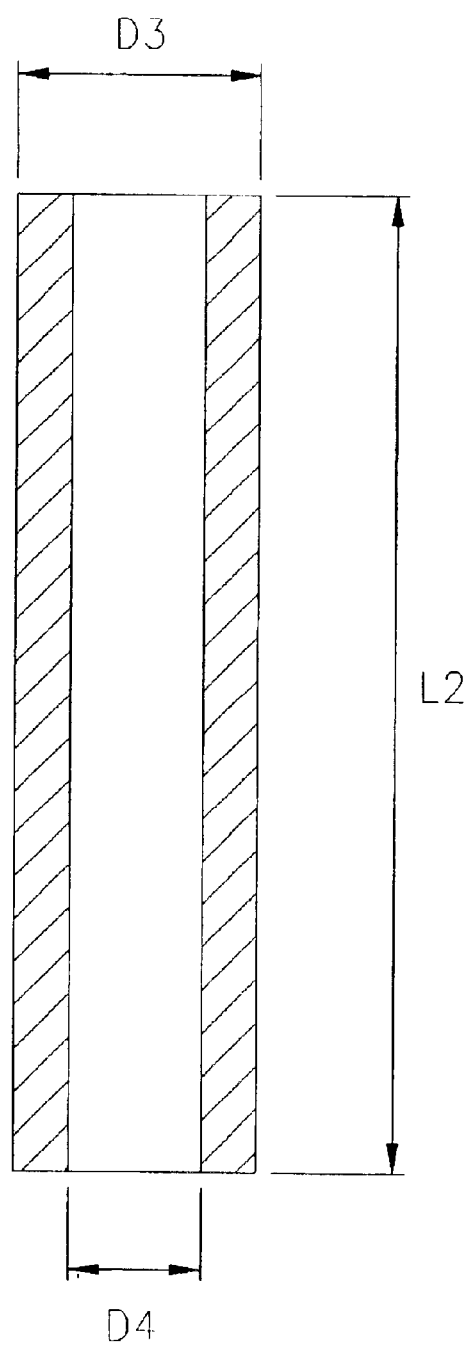
FIG. 2 is a longitudinal sectional view of the preferred embodiment of the tube or rod placed unconstrained within the body of the hydrocyclone shown in FIG. 1.

As shown in FIG. 2, in the preferred embodiment of the invention, tube or rod 22 is rigid, having both ends perpendicular to the longitudinal axis, an outside diameter D3 less than ⅜ of the inside diameter D1 of body 10, an outside diameter D3 greater than the diameter D2 of lower outlet aperture 16, an outside diameter D3 greater than the inside diameter of vortex finder tube 20, and a length L2 at least greater than and at most approximately twice the inside diameter D1 of body 10. Tube or rod 22 is preferably a hollow tube with an inside diameter D4 of from about 50% to about 95% of its outside diameter D3. Alternatively, tube or rod 22 may be a solid rod (inside diameter D4 equal to zero).

Tube or rod 22 must be made of a material having a density greater than the density of the liquid fraction of the gas-liquid emulsion, such that it does not float within the hydrocyclone during operation It should be made of a material resistant to abrasion, erosion, and corrosion by contact with the internals of the hydrocyclone and the gas-liquid emulsion.

Tube or rod 22 is placed unconstrained within body 10.

The scope of the invention includes provision of a multiplicity of tubes and/or rods placed unconstrained within body 10 acting in the aggregate as tube or rod 22.

In the operation of the preferred embodiment of the invention, incoming stabilized air-water emulsion, with a bulk density relative to water of between 60% and 90% and pressurized to between 13 psig and 40 psig, enters the hydrocyclone as in "a" through tangential inlet conduit 18. The centrifugal force induced by the rotation of the emulsion within body 10 causes the emulsion to separate into fractions of greater and lesser bulk density. The fraction of greater bulk density migrates towards the periphery of body 10 while being displaced towards the lower end. Simultaneously, the fraction of lesser bulk density migrates towards the center of body 10 while forming a co-rotational inner vortex moving in a countercurrent longitudinal direction towards vortex finder tube 20. Tube or rod 22 is carried in generally circular motion along with the rotating fluid, and reduces the rate of air flow into lower outlet aperture 16. The lesser bulk density fraction of the emulsion, that having a bulk density relative to water of between about 50% and 70%, flows as in "c" under pressure out through vortex finder tube 20 to further processing means or to ultimate uses not shown. The greater bulk density fraction of the emulsion, that having a bulk density relative to water of between about 70% and 95%, discharges as in "b" out of lower outlet aperture 16.

From the above disclosure of the general principles of the present invention and the preceding detailed description of a preferred embodiment, those skilled in the art will readily comprehend the various modifications to which the present invention is susceptible. Therefore, the inventor desires to be limited only by the scope of the following claims and legal equivalents thereof.

What is claimed is:

1. In a hydrocyclone having a body including an interior surface, a tangential inlet into the body, an upper outlet from the body proximal to the tangential inlet, and a lower outlet from the body distal to the tangential inlet, the lower outlet having a singly perforated flat plate including an interior surface; the improvement comprising: a tube or rod placed within said body of said hydrocyclone, the tube or rod being entirely within the body of said hydrocyclone and constrained only by contact with the singly perforated flat plate's interior surface and the body's interior surface.

2. A hydrocyclone as in claim 1, wherein the body is a cylindrical body.

3. A hydrocyclone as in claim 1, wherein the body tapers so as to have a larger diameter at the upper outlet and a lesser diameter at the lower outlet.

* * * * *